(12) United States Patent
Schmeilin

(10) Patent No.: US 12,468,564 B1
(45) Date of Patent: Nov. 11, 2025

(54) ON-PREMISES NETWORK INTERFACE ADAPTED FOR CLOUD-BASED SERVICES

(71) Applicant: Amazon Technologies, Inc., Seattle, WA (US)

(72) Inventor: Evgeny Schmeilin, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 582 days.

(21) Appl. No.: 17/956,585

(22) Filed: Sep. 29, 2022

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/45579* (2013.01); *G06F 2009/45595* (2013.01); *G06F 2213/0024* (2013.01)

(58) Field of Classification Search
None
See application file for complete search history.

(56) References Cited

U.S. PATENT DOCUMENTS

| | | | |
|---|---|---|---|
| 6,594,712 B1* | 7/2003 | Pettey | G06F 13/385 710/36 |
| 6,704,831 B1* | 3/2004 | Avery | G06F 13/404 710/310 |
| 7,694,023 B1* | 4/2010 | Hokenson | G06F 15/17375 370/227 |
| 10,387,349 B1* | 8/2019 | Arroyo | G06F 13/4027 |
| 2003/0131173 A1* | 7/2003 | Cassidy | G06F 13/4221 710/308 |
| 2016/0188518 A1* | 6/2016 | Gardiner | G06F 13/4045 710/104 |
| 2017/0187629 A1* | 6/2017 | Shalev | H04L 43/0852 |
| 2017/0272400 A1* | 9/2017 | Bansal | H04L 41/0806 |

* cited by examiner

*Primary Examiner* — Mustafa A Amin
(74) *Attorney, Agent, or Firm* — Klarquist Sparkman, LLP

(57) ABSTRACT

Cloud services, such as a storage service, are able to communicate through a virtual PCI request over a non-PCI bus by using a modified device driver that communicates with a network interface. One or more cloud services can execute on a same board or within a same Integrated Circuit (IC) as the network interface. The network interface adapts communications from the one or more services by allowing the services to use a PCI protocol despite that the services are not communicating with the network interface over a PCI bus.

20 Claims, 6 Drawing Sheets

ON-PREMISES NETWORK INTERFACE ADAPTED FOR CLOUD-BASED SERVICES

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Some users desire cloud-like infrastructure and services but delivered on-premises at a user location. Generally, the users maintain a rack of server computers that allow for local data processing, but with familiar cloud APIs and services. In one example, the rack of server computers can execute virtual machines, while offering other cloud services.

Migration of cloud services to an on-premise rack of server computers can be problematic, especially if services previously executing remotely from the virtual machines now execute in a same server computer as the virtual machines.

DETAILED DESCRIPTION

Figure 1:
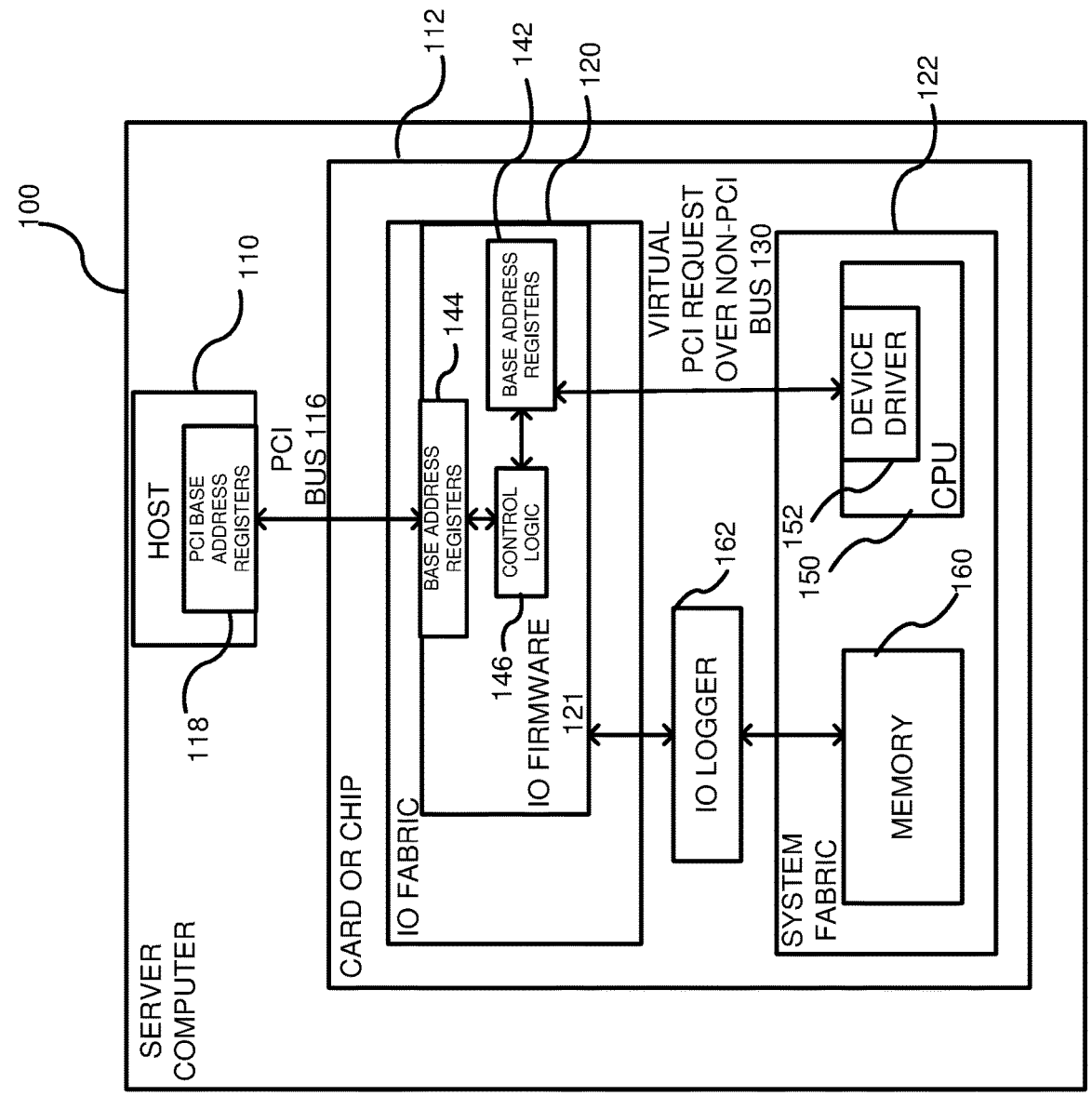
FIG. 1 is a system diagram of a server computer, according to one embodiment, including a network interface positioned on a same card or chip as a system fabric used to execute cloud services.

Cloud services, such as a storage service, are able to communicate through a virtual PCI request over a non-PCI bus (local bus) by using a modified device driver that communicates with a network interface. One or more cloud services can execute on a same board or within a same Integrated Circuit (IC) as the network interface. The network interface adapts communications from the one or more services by allowing the services to use a PCI protocol despite that the services are not communicating with the network interface over a PCI bus.

By way of background, a compute service provider (i.e., the cloud provider) is capable of delivery of computing and storage capacity as a service to a community of end recipients. In an example embodiment, the compute service provider can be established for an organization by or on behalf of the organization. Generally speaking, the compute service provider can provide the following models: Infrastructure as a Service ("IaaS"), Platform as a Service ("PaaS"), and/or Software as a Service ("SaaS"). Other models can be provided. For the IaaS model, the compute service provider can offer computers as physical or virtual machines and other resources. The virtual machines can be run as guests by a hypervisor, as described further below. The PaaS model delivers a computing platform that can include an operating system, programming language execution environment, database, and web server. The SaaS model allows installation and operation of application software in the compute service provider. Users access the compute service provider using networked client devices, such as desktop computers, laptops, tablets, smartphones, etc. running web browsers or other lightweight client applications. Those skilled in the art will recognize that the compute service provider can be described as providing a "cloud" environment.

In some implementations of the disclosed technology, the compute service provider can provide a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services and the hardware and software that provide those services. However, in some situations, users desire the services and functionality of cloud computing, but using one or more server computers located in their own facilities (so-called "on premises"). Development of on-premises solutions can be problematic because cloud services typically communicate with virtual machines over a network. Thus, services executing in a same physical server computer as the virtual machine causes compatibility issues.

With the on-premise cloud provider solution, the cloud provider may implement various computing resources or services that implement the disclosed techniques for Transport Layer Security (TLS) session management, for example, which may include an elastic compute cloud service (referred to in various implementations as an elastic compute service, a virtual machines service, a computing cloud service, a compute engine, or a cloud compute service, for example), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services).

FIG. 1 shows a server computer 100 according to one embodiment. The server computer 100 can include a host 110 and a sub-system 112, which can be a plug-in card (such as a network interface card (NIC) or other expansion card) or a chip on a plug-in card coupled to the host 110 using a Peripheral Component Interconnect (PCI) bus 116. The bus 116 is a communication channel that transfers data between the host 110 and the sub-system 112. The bus can use a standard bus protocol, such as PCIe. The term "PCI", "PCIe" or "PCI-based" may be used herein to describe any protocol in the PCI family of bus protocols. PCI includes the original PCI standard, PCI-eXtended (PCI-X), Accelerated Graphics Port (AGP), and PCI Express (PCIe, also referred to as PCI-XP). Other bus protocols can be used for bus 116, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols. The host 110 can include PCI base address registers 118 used for communicating over the PCI bus 116.

Figure 3:
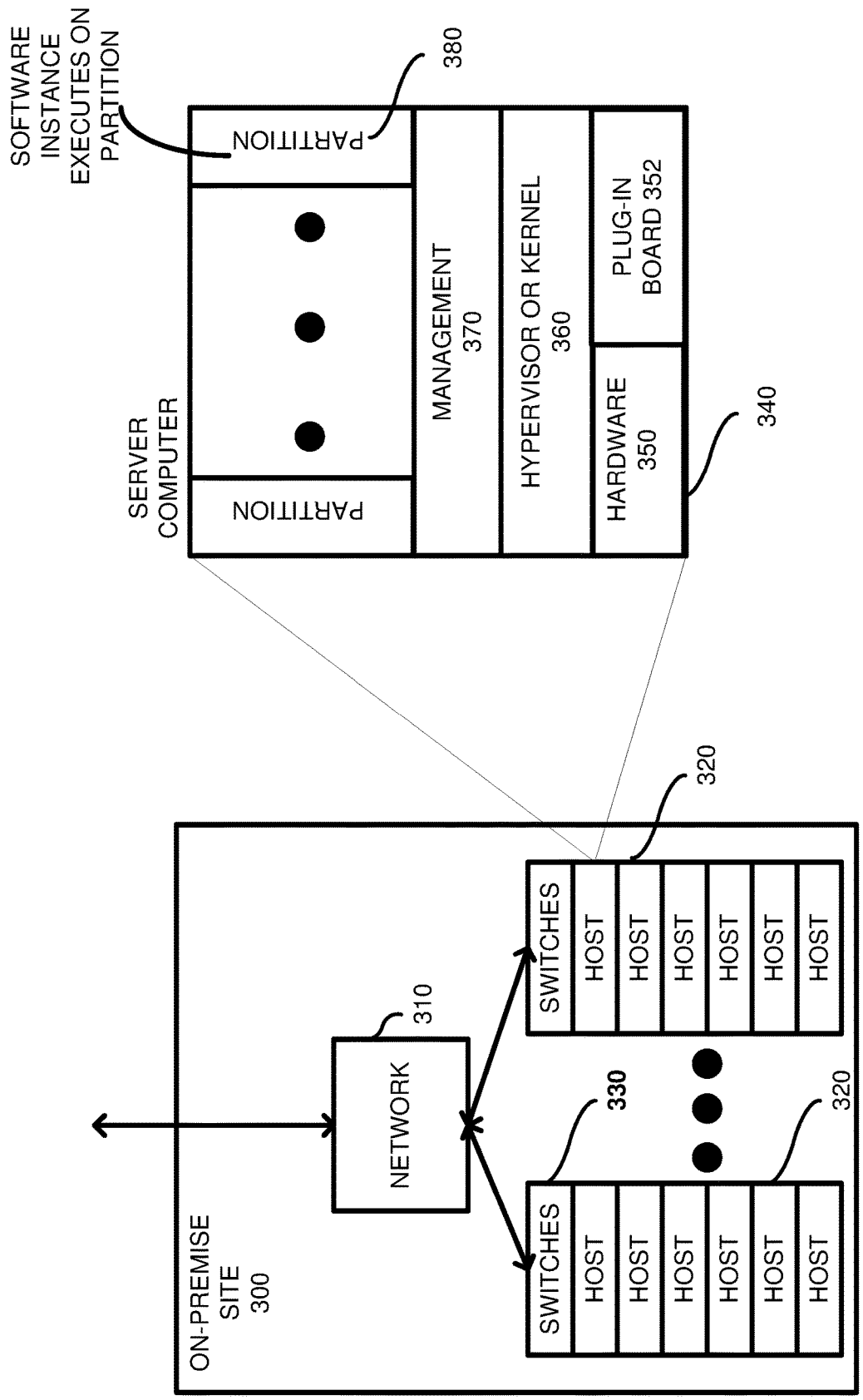
FIG. 3 is a diagram showing a rack of server computers positioned on-premises for hosting cloud services.

The host 110 generally includes a motherboard (not shown) having a main processor, memory, etc. of the server computer 100. Additional example components of the server computer 100 can be found in FIG. 6. Although shown separately, the sub-system 112 can be integrated into the motherboard of the server computer 100. Additionally, the host 110 is used for executing virtual machines executing on the server computer. The virtual machines are shown in FIG. 3 and are described further below. The sub-system 112 can include an IO fabric 120 and a system fabric 122. The IO fabric can operate as a Network Interface Card (NIC) and receives Application Programming Interface (API) requests from the host 110 and transmits such requests to the system fabric 122, which can perform a service and can include a processor or Central Processing Unit (CPU) 150 (or SoC) and a memory 160. The NIC can have an Internet Protocol (IP) address and a media access control (MAC) address. Additionally, the NIC can be logically attached to a virtual machine executing on the host 110. Services are commonly used in cloud computing. A service is a software function provided at a network address over the web or the cloud. Clients initiate service requests to services, and services process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via a network-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request. With the server computer 100, the endpoint can be an IP address of the IO fabric 120 and the response can then be forwarded from the IO fabric 120 to the host 110. Because the IO fabric 120 and the system fabric 122 are on the same plug-in card or on a same chip, the communication is over a simple internal bus 130 that is not a PCI bus. One difference between an internal bus and a PCI bus is that the PCI bus includes power and ground lines whereas the internal bus does not need to supply power and ground. Other differences can apply, such as that a PCI bus can include parity error pins, while the internal bus can be simply data, address and control signals (read/write, etc.), a clock signal, etc.

The IO fabric 120 can include IO firmware 121 having memory for Base Address Registers (BARs) 142, 144. The BARs 142 are used to communicate with the system fabric 122 and the BARs 144 are used to communicate with the host 110. Control logic 146 reads communications in the BARs 142 and 144 and ensures that the communications are forwarded to the correct destination. To communicate with the host 110 or store information in the system fabric 122, the services executing on the CPU 150 can use a device driver 152, which also executes on the CPU. Although the services executing on the CPU are designed to execute on a separate server computer, the device driver 152 can ensure that any request from such services is a virtual PCI request over the local bus 130. More specifically, the virtual PCI request can be an API request with the data/address and control signals corresponding to the pinout of the local bus 130, which is not a PCI bus. Thus, the device driver 152 can perform a write command over the local bus 130 by writing the request to the BARs 142, which is an address space corresponding to a virtual PCI bar instead of an actual PCI bar, wherein the virtual PCI bar and the actual PCI bar have differing addresses. The control logic 146 can then read the BARs 142, convert the request into a PCI request needed for communication over the PCI bus 116 to the host 110. In some cases, the IO fabric 120 can interpret the request stored in BAR 142 as a request to store data in a memory 160 or a request to be transferred to an IO logger 162, depending on the destination address of the request. In response, the control logic 146 can move the data to the corresponding destination address.

Figure 2:
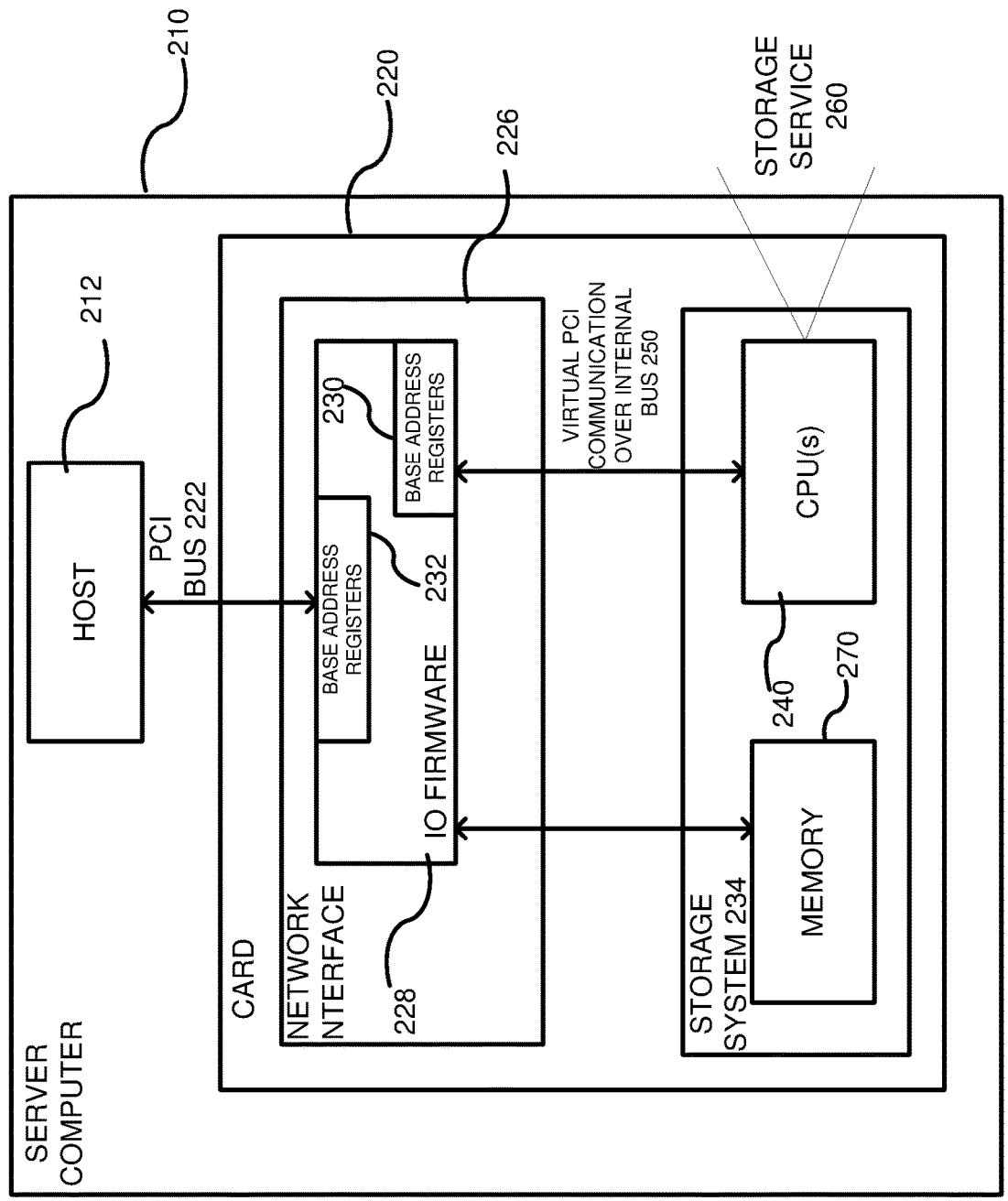
FIG. 2 is a system diagram of a server computer, according to another embodiment, where a network interface communicates with a storage service executing on the server computer.

FIG. 2 shows another embodiment of a server computer 210, which includes a host 212 and a plug-in card 220 coupled together through a PCI bus 222. The card 220 includes a network interface 226, which comprises firmware 228, and a storage system 234. The firmware 228 includes BARs 230, 232 for communication with a CPU 240 and the host 212, respectively. The CPU 240 is positioned on the same card 220 as the network interface 226. Consequently, communications between the CPU 240 and the network interface 226 occur over an internal bus 250. The CPU 240 executes a storage service 260 that is designed to transmit over a PCI bus, but the storage service 260 includes or communicates with software (e.g., a device driver), which transmits an API as a virtual PCI communication that is stored in the BAR 230. The IO firmware 228 retrieves the virtual PCI communication from the BAR 230 and either converts it to a PCI request for transmission over the PCI bus 222 to the host 212 or stores data in a memory 270 for the storage service 260. More specifically, the IO firmware 228 interprets a destination address in a header of the virtual PCI communication and directs the virtual PCI communication to either the host 212 or the memory 270 based upon the destination address using a write command over the internal bus 250. When converting the request to a PCI request, the IO firmware 228 places the request within PCI base registers 232 including the header and packet data.

FIG. 3 illustrates the server computers of either FIG. 1 or FIG. 2 within an on-premise site 300, which can be a building or a data center. A network 310 routes packets to one or more racks of host server computers 320. Each rack 320 can include a switch 330 coupled to multiple host server computers. A particular host server computer is shown in an expanded view at 340. Each host 340 has underlying hardware 350 including one or more CPUs, memory, storage devices, etc. The underlying hardware 350 can include a plug-in circuit board 352, which can be the card 112 (FIG. 1) or card 220 (FIG. 2). Running a layer above the hardware 350 is a hypervisor or kernel layer 360. The hypervisor or kernel layer can be classified as a type 1 or type 2 hypervisor. A type 1 hypervisor runs directly on the host hardware 350 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 370 can be part of the hypervisor or separated therefrom and generally includes device drivers needed for accessing the hardware 350. The partitions 380 are logical units of isolation by the hypervisor. Each partition 380 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 370. Additionally, the applications can transmit API requests and receive API responses to services executing on the plug-in board 352, as described above. In one example, the plug-in board can execute a storage service that attaches volumes to the partitions 380 independently of each other. Thus, one volume can be attached to one partition while another volume is attached to another partition. The plug-in board can act as a NIC in combination with the storage service, which can execute on its own processor independent of a network interface. Communications between the network interface and the processor can occur over a local bus, as described above.

Figure 4:
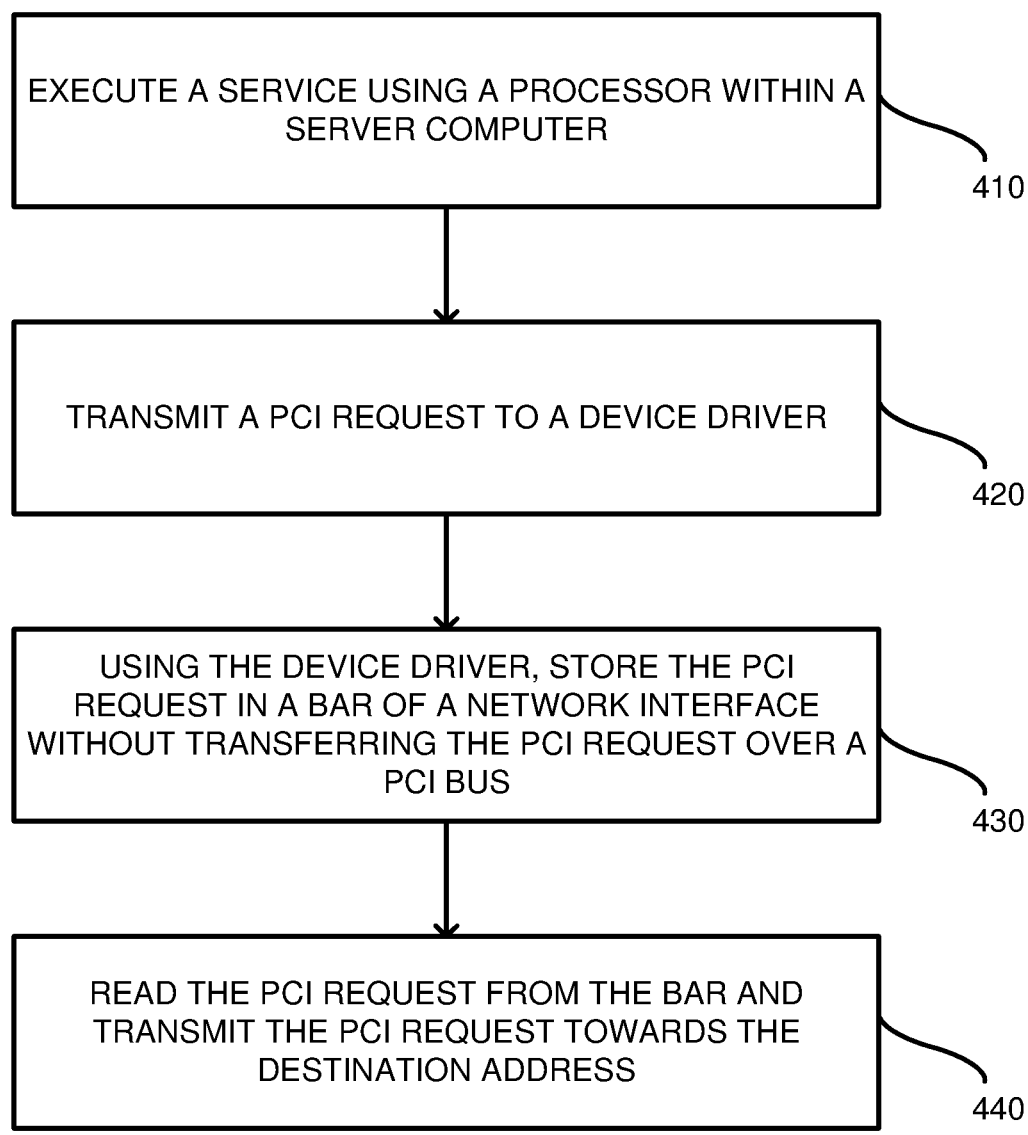
FIG. 4 is a flowchart according to one embodiment for using a network interface adapted to execute cloud services on a server computer.

FIG. 4 is a flowchart according to one embodiment of a method for implementing a cloud service using a network interface. In process block 410, a service is executed using a processor within a server computer. For example, in FIG. 1, instead of the service executing on the host 110, the service can execute on a CPU 122 positioned on a card plugged into the server computer. In process block 420, a request is transmitted a device driver. The request can be an API request that is meant for transmission over a PCI bus, for example. In process block 430, using the device driver, the request is stored in a BAR of the network interface without transferring the request over a PCI bus. For example, in FIG. 1, despite that the service executing on the CPU 122 is configured to transmit a request over a PCI bus, the device driver then transmits the request over a local bus 130 and stores the request in the BAR 142. In process block 440, the PCI request is read from the BAR and transmitted towards its destination. For example, in FIG. 1, the control logic 146 can read the BAR 142 and transmit the request to the destination address. Transmission to the destination address can include transmitting the request over a local bus to an IO logger 162 (FIG. 1) for storage in memory 160, or it can include converting the request from the BAR 142 to a PCI request for transmission over the PCI bus 116.

Figure 5:
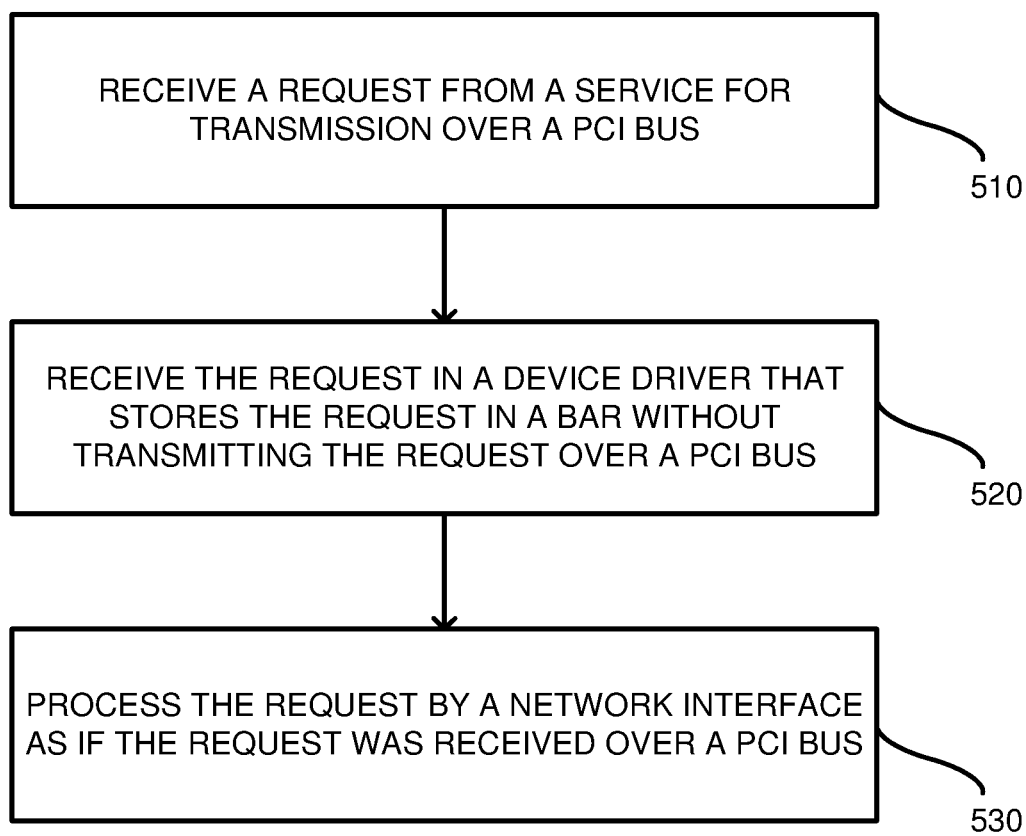
FIG. 5 is a flowchart according to another embodiment for using a network interface adapted to execute cloud services on a server computer.

FIG. 5 is a flowchart according to another embodiment. In process block 510, a request is received from a service for transmission over a PCI bus. For example, in FIG. 2, the service 260 can request a transmission to be sent over a PCI bus. In process block 520, the request can be received in a device driver that stores the request in a BAR without transmission over a PCI bus. For example, in FIG. 2, a device driver executing on a same CPU 240 as the storage service 260 can transmit the request by storing the request in the BAR 230. In process block 530, the request can be processed by a network interface as if the request was received over a PCI bus. For example, in FIG. 1, the control logic 146 can store data in response to the request in the memory 160 via the IO logger 162.

Figure 6:
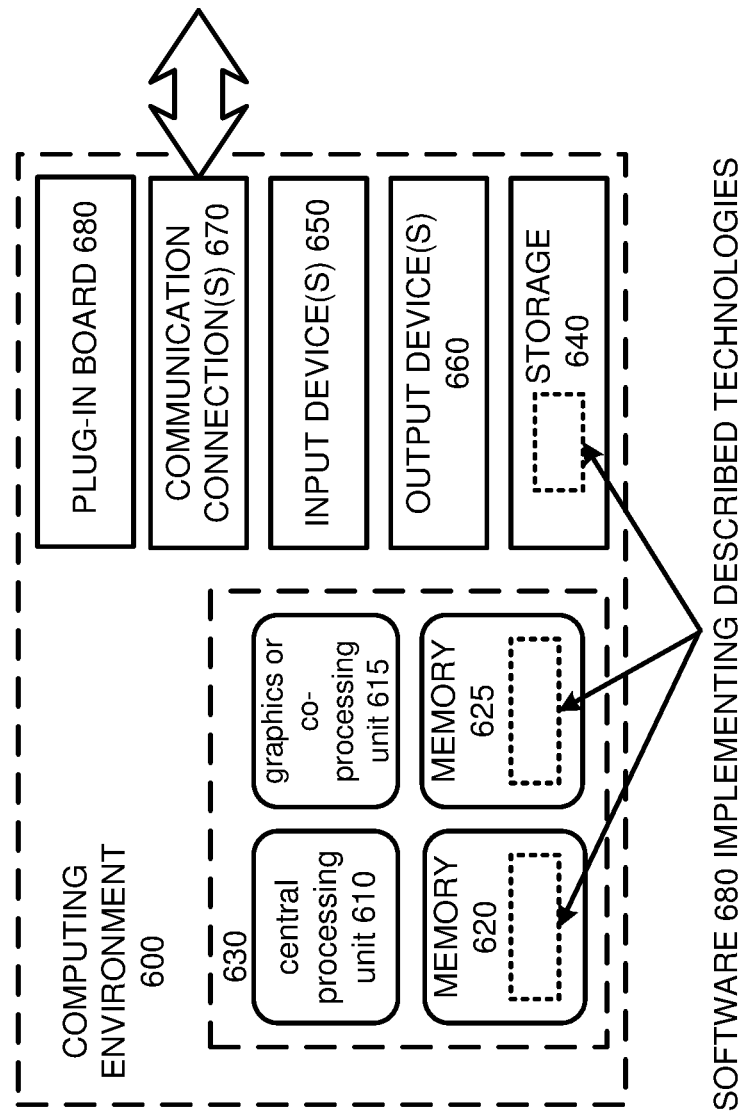
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

One or more plug-in boards 680 can be used to implement the IO fabric 120 and system fabric 122 of FIG. 1. Alternatively, the plug-in boards 680 can be used to implement the IO firmware 228 and system storage of FIG. 2.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of executing a service within a server computer, the method comprising:
    executing the service of a compute service provider using a processor within the server computer;
    transmitting a request to a device driver executed by the processor;
    using the device driver, storing the request in a base address register of a network interface positioned between the service and a host that executes a virtual machine without transferring the request over a Peripheral Component Interconnect (PCI) bus; and
    using control logic in the network interface, reading the request from the base address register and transmitting the request towards a destination address.

2. The method of claim 1, wherein the processor and the network interface are on a network interface card within the server computer.

3. The method of claim 1, wherein the service is a storage service.

4. The method of claim 1, wherein the host is coupled to the network interface using a PCI bus.

5. The method of claim 1, wherein the network interface is assigned an Internet Protocol (IP) address and is attached to the virtual machine.

6. A method, comprising:
    receiving a request from a service of a compute service provider for transmission over a Peripheral Component Interconnect (PCI) bus;
    receiving the request in a device driver that stores the request in a base address register of a network interface without transmitting the request over a PCI bus; and
    processing the request by the network interface as if it were received over a PCI bus.

7. The method of claim 6, wherein the service executes on a processor that is positioned on a same printed circuit board as the network interface.

8. The method of claim 6, further including executing a virtual machine on a host that is coupled to the network interface through a PCI bus.

9. The method of claim 8, wherein the service is a storage service that attaches volumes to the virtual machine.

10. The method of claim 6, wherein the service is a storage service and the method further includes using the network interface to store data associated with the PCI request in a memory of the storage service.

11. The method of claim 6, wherein the network interface is assigned an Internet Protocol (IP) address.

12. The method of claim 6, wherein the device driver uses a write command to write the request to the base address registers of the network interface.

13. The method of claim 6, wherein the request is an Application Programming Interface (API) request to be transmitted over a PCI bus.

14. The method of claim 6, wherein the processing of the request includes generating a PCI request corresponding to the request and transmitting the PCI request to a host over a PCI bus.

15. A server computer, comprising:
a host;
a network interface coupled to the host using a first bus type;
a processor couped to the network interface through a second bus type, the processor configured to execute a service of a compute service provider; and
a device driver configured to execute on the processor and to receive messages from the service that are for transmission over the first bus type and storing the messages in a memory of the network interface using the second bus type.

16. The server computer of claim 15, wherein first bus type is a Peripheral Component Interconnect (PCI) bus and the second bus type is an internal bus on a plug-in board on the server computer.

17. The server computer of claim 15, wherein the memory of the network interface includes base address registers of the network interface.

18. The server computer of claim 15, wherein the service is a storage service and the host is configured to execute virtual machines coupled to storage volumes of the storage service.

19. The server computer of claim 15, the network interface includes an Internet Protocol (IP) address and is logically attached to a virtual machine executing on the host.

20. The server computer of claim 15, wherein the service executes on the processor that is positioned on a same printed circuit board as the network interface.

* * * * *